United States Patent
Lam

(10) Patent No.: US 10,656,338 B2
(45) Date of Patent: May 19, 2020

(54) WAFER-LEVEL OPTOELECTRONIC PACKAGING

(71) Applicant: POET TECHNOLOGIES, INC., San Jose, CA (US)

(72) Inventor: Yee Loy Lam, Singapore (SG)

(73) Assignee: POET Technologies, Inc., San Jose, CA (US)

( * ) Notice: Subject to any disclaimer, the term of this patent is extended or adjusted under 35 U.S.C. 154(b) by 0 days.

(21) Appl. No.: 15/802,009

(22) Filed: Nov. 2, 2017

(65) Prior Publication Data
US 2019/0129099 A1    May 2, 2019

(51) Int. Cl.
*G02B 6/12* (2006.01)
*G02B 6/30* (2006.01)
(Continued)

(52) U.S. Cl.
CPC .............. *G02B 6/30* (2013.01); *G02B 6/122* (2013.01); *G02B 6/12004* (2013.01);
(Continued)

(58) Field of Classification Search
CPC ...... G02B 6/4251; G02B 6/4201; G02B 6/30; G02B 6/122; G02B 6/132; G02B 6/136; H01L 21/52
See application file for complete search history.

(56) References Cited

U.S. PATENT DOCUMENTS

| | | |
|---|---|---|
| 5,621,837 A | 4/1997 | Yamada et al. |
| 6,215,917 B1 | 4/2001 | Takahashi et al. |

(Continued)

FOREIGN PATENT DOCUMENTS

| | | |
|---|---|---|
| JP | 2000-249874 A | 9/2000 |
| JP | 2013-057721 A | 3/2013 |
| KR | 100659587 B1 | 12/2006 |

OTHER PUBLICATIONS

Yasufumi Yamada et al., "Hybrid Integrated 4×4 Optical Gate Matrix Switch Using Silica-Based Optical Waveguides and LD Array Chips", Journal of Lightwave Technology, Mar. 1992, vol. 10, No. 3, IEEE, pp. 383-390.

(Continued)

*Primary Examiner* — Kaveh C Kianni
*Assistant Examiner* — Hung Q Lam
(74) *Attorney, Agent, or Firm* — Tue Nguyen

(57) ABSTRACT

A wafer-level optoelectronic packaging method includes fabricating a pre-singulated wafer. The pre-singulated wafer has a plurality of sub-mounts. A first sub-mount of the plurality of sub-mounts includes an optical waveguide formed on a substrate, a multi-layered sub-mount boundary wall that is formed on the optical waveguide, and a v-groove that is external to the sub-mount boundary wall. A plurality of optical dies are attached to the corresponding plurality of sub-mounts, such that each optical die is aligned to the optical waveguide of the corresponding sub-mount. A cap-wafer including a plurality of caps is attached to the pre-singulated wafer to obtain an encapsulated pre-singulated wafer. The encapsulated pre-singulated wafer is diced to obtain a plurality of optoelectronic packages. The optical waveguide of each optoelectronic package serves as an interconnection conduit between the corresponding optical die and an optical fiber placed in the corresponding v-groove.

8 Claims, 19 Drawing Sheets

(51) Int. Cl.
*G02B 6/136* (2006.01)
*G02B 6/132* (2006.01)
*G02B 6/122* (2006.01)
*G02B 6/42* (2006.01)
*G02B 6/36* (2006.01)

(52) U.S. Cl.
CPC ............ *G02B 6/132* (2013.01); *G02B 6/136* (2013.01); *G02B 6/3652* (2013.01); *G02B 6/423* (2013.01)

(56) References Cited

U.S. PATENT DOCUMENTS

| | | | |
|---|---|---|---|
| 6,567,590 B1 * | 5/2003 | Okada | H01S 5/02252 385/14 |
| 6,704,337 B2 * | 3/2004 | Kitaoka | G02B 6/12004 372/50.1 |
| 6,981,806 B2 | 1/2006 | Benzoni et al. | |
| 7,486,846 B2 * | 2/2009 | Warashina | G02B 6/4246 385/14 |
| 8,548,015 B2 | 10/2013 | Choi | |
| 8,791,557 B2 | 7/2014 | Chang et al. | |
| 2003/0081914 A1 | 5/2003 | Steinberg et al. | |
| 2003/0137022 A1 | 7/2003 | Dautartas et al. | |
| 2003/0165169 A1 * | 9/2003 | Nomoto | H01S 5/0425 372/46.01 |
| 2013/0209026 A1 | 8/2013 | Doany et al. | |

OTHER PUBLICATIONS

International Search Report of corresponding International Application No. PCT/IB2018/001286 from Korean Patent Office, dated Mar. 28, 2019, completed Mar. 28, 2019, pp. 1-3.

* cited by examiner

US 10,656,338 B2

WAFER-LEVEL OPTOELECTRONIC PACKAGING

FIELD OF THE INVENTION

The present invention relates to optoelectronic communication systems, and more particularly to a method for manufacturing optoelectronic packages for optical coupling.

BACKGROUND

Optoelectronic packages generally include one or more optical dies, such as waveguide-based diode lasers, photo-detectors, and planar lightwave circuits (PLCs), enclosed in a cavity formed by a cap and a substrate to which the optical dies are attached. Optical signals from the optical dies are coupled to an optical fiber for communication over long distances. The optoelectronic packages generally rely on free space light propagation for transmitting the optical signals from the cavity for coupling with the optical fiber or an optical waveguide.

FIG. 1 shows a cross-sectional view of a first conventional optoelectronic package 100 for coupling optical signals to an optical fiber 102. In the first conventional optoelectronic package 100, an optical die 104 is attached to a sub-mount substrate 106, and a mirror 108 is fitted in a mirror guiding hole (not shown) formed on the sub-mount substrate 106. A cap 110, having a cavity 112, is attached to the sub-mount substrate 106 by way of a bond layer 114 therebetween. The bond layer 114 can be made from various materials, such as adhesive resins, solder material, and the like. The cap 110 includes a first lens 116 fitted in a lens guiding hole (not shown) that is formed on the cap 110. The mirror 108 receives a first optical signal OS1 that is parallel to the surface of the sub-mount substrate 106 from the optical die 104. The mirror 108 reflects the first optical signal OS1, thereby making the first optical signal OS1 perpendicular to the surface of the sub-mount substrate 106. After reflection, the first optical signal OS1 propagates in free space through the cavity 112 and the cap 110, and becomes incident upon the first lens 116. The first lens 116 focusses the first optical signal OS1 onto a second lens 118. The second lens 118 couples the first optical signal OS1 to the optical fiber 102, which in turn transmits the first optical signal OS1 over long distances to one or more remote devices (not shown).

FIG. 2 shows a cross-sectional view of a second conventional optoelectronic package 200 for coupling optical signals to an optical waveguide 202 of a silicon photonic chip 204. In the second conventional optoelectronic package 200, an optical die 206 is attached to a sub-mount substrate 208. A cap 210, having a cavity 212, is attached to the sub-mount substrate 208 by way of a bond layer 214 therebetween. The bond layer 214 can be made from various materials, such as adhesive resins, solder material, and the like. The optical die 206 emits a second optical signal OS2 in a direction that is parallel to the surface of the sub-mount substrate 208. The second optical signal OS2 becomes incident upon the internal surface of the cap 210, which is coated with a reflective material. The internal surface of the cap 210 reflects the second optical signal OS2. After reflection, the second optical signal OS2 propagates in free space through the sub-mount substrate 208, and becomes incident upon a third lens 216. The third lens 216 focusses the second optical signal OS2 onto a grating coupler 218, which is mounted on the optical waveguide 202. The grating coupler 218 couples the second optical signal OS2 to the optical waveguide 202, which in turn may couple the second optical signal OS2 to an optical fiber (not shown) for transmission to one or more remote devices.

In the first and second conventional optoelectronic packages 100 and 200, the first and second optical signals OS1 and OS2 undergo high propagation and reflection losses due to propagation in the free space, respectively. Further, the poor coupling efficiency of the second and third lenses 118 and 216 results in coupling losses of the first and second optical signals OS1 and OS2 into the optical fiber 102 and the grating coupler 218, respectively. A known solution for improving the coupling efficiency of the second and third lenses 118 and 216 is to use active alignment techniques for aligning the optical path of the second and third lenses 118 and 216 to the optical path of the optical fiber 102 and the grating coupler 218, respectively. However, the active alignment techniques are complex to implement. Further, the grating coupler 218 can couple optical signals that lie in a particular wavelength range to the optical waveguide 202. Thus, the grating coupler 218 limits the operational wavelength bandwidth of the second conventional optoelectronic package 200, which is undesirable.

In light of the foregoing, there exists a need for an optoelectronic package that prevents the propagation of optical signals in free space, has less propagation and reflection losses, large operation wavelength bandwidth as compared to the first and second conventional optoelectronic packages 100 and 200, and does not require additional components, such as lenses, for coupling the optical signals at its output.

SUMMARY

In an embodiment of the present invention, an optoelectronic package is provided. The optoelectronic package includes a sub-mount, an optical die, and a cap. The sub-mount includes an optical waveguide that is formed on a substrate, and a sub-mount boundary wall that is formed on the optical waveguide. The sub-mount boundary wall includes a first dielectric layer formed on the optical waveguide, and a first metal layer formed on the first dielectric layer. The sub-mount boundary wall further includes a second dielectric layer formed on the first metal layer, and a second metal layer formed on the second dielectric layer. The optical die is attached to the sub-mount. The cap is attached to the sub-mount to form a cavity for enclosing the optical die.

In another embodiment of the present invention, a method for wafer-level optoelectronic packaging is provided. The method includes fabricating a pre-singulated wafer having a plurality of sub-mounts that include a first sub-mount. The first sub-mount includes an optical waveguide formed on a substrate, and a sub-mount boundary wall that is formed on the optical waveguide. The sub-mount boundary wall includes a first dielectric layer formed on the optical waveguide, and a first metal layer formed on the first dielectric layer. The sub-mount boundary wall further includes a second dielectric layer formed on the first metal layer, and a second metal layer formed on the second dielectric layer. A first optical die of a plurality of optical dies is attached to the first sub-mount. A cap-wafer including a plurality of caps is attached to the pre-singulated wafer for obtaining an encapsulated pre-singulated wafer, when each of the plurality of optical dies is attached to the corresponding sub-mount. The encapsulated pre-singulated wafer is diced to obtain a plurality of optoelectronic packages. A first optoelectronic package of the plurality of optoelectronic packages includes the first optical die enclosed within the cavity formed by a first cap of the plurality of caps and the first sub-mount.

In yet another embodiment of the present invention, a plurality of optoelectronic packages manufactured by the method as described in the foregoing is provided.

Various embodiments of the present invention provide a method for optoelectronic packaging at wafer-level and an optoelectronic package manufactured by performing the method. A pre-singulated wafer is fabricated by performing one or more wafer processing operations, such as patterned deposition, etching, lithography, and the like, on a first substrate. The pre-singulated wafer has a plurality of sub-mounts that include a first sub-mount. The first sub-mount includes an optical waveguide formed on the first substrate, and a sub-mount boundary wall formed on the optical waveguide. A v-groove is formed on the first substrate for each of the plurality of sub-mounts by etching the first substrate. The v-groove of each sub-mount is external to the corresponding sub-mount boundary wall. The sub-mount boundary wall is a multi-layered structure that includes a first dielectric layer formed on the optical waveguide, a first metal layer formed on the first dielectric layer, a second dielectric layer formed on the first metal layer, and a second metal layer formed on the second dielectric layer. The first metal layer is a high-frequency electrical wiring trace and the second metal layer is a solder layer. The pre-singulated wafer has uniform topography height, such that the sub-mount boundary walls of the plurality of sub-mounts have same height.

A first optical die of a plurality of optical dies is permanently attached to the first sub-mount by way of soldering. The optical waveguide is aligned with the first optical die for receiving an optical signal from the first optical die. A cap wafer is fabricated by performing one or more wafer processing operations, such as deposition, etching, lithography, and the like, on a second substrate. The cap wafer has a plurality of caps including a first cap. The first cap has first and second openings. When the plurality of optical dies are permanently attached to the corresponding sub-mounts, the cap wafer is attached to the pre-singulated wafer for obtaining an encapsulated pre-singulated wafer by way of hermetic sealing. When the cap wafer is attached to the pre-singulated wafer, the first cap overlaps the first sub-mount to form a cavity for enclosing the first optical die. The cavity is a hermetically sealed cavity. The first opening of the first cap exposes the v-groove of the first sub-mount, and the second opening exposes the first metal layer that lies outside the cavity.

The encapsulated pre-singulated wafer is then diced to obtain a plurality of optoelectronic packages including a first optoelectronic package. The first optoelectronic package includes the first optical die enclosed within the cavity formed by the first cap and the first sub-mount, and the v-groove of the first sub-mount. An optical fiber is placed in the v-groove of the first optoelectronic package. When the optical fiber is placed in the v-groove, the optical fiber gets aligned with the optical waveguide that lies outside the cavity for receiving the optical signal from the first optical die.

In the first optoelectronic package, manufactured by the method as explained in the foregoing, the optical waveguide is accurately aligned with the first optical die for receiving optical signals from the first optical die and is further aligned with the optical fiber for coupling the optical signals to the optical fiber, with high coupling efficiency. Thus, the optical waveguide serves as an interconnection conduit between the first optical die and the optical fiber for propagation of the optical signals emitted by the first optical die. Hence, the first optoelectronic package prevents the propagation of the optical signals in free space, and hence reduces the propagation losses. The optical waveguide further eliminates the need of additional components, such as lenses and grating couplers for coupling the optical signals from the first optical die to the optical fiber. The first optoelectronic package has large operational wavelength bandwidth as it does not use the grating coupler.

BRIEF DESCRIPTION OF THE DRAWINGS

The accompanying drawings illustrate various embodiments of systems, methods, and other aspects of the invention. It will be apparent to a person skilled in the art that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa.

Various embodiments of the present invention are illustrated by way of example, and not limited by the appended figures, in which like references indicate similar elements, and in which.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

A "substrate" as used herein and throughout this disclosure refers to, but is not limited to, a surface upon which semiconductor structures, such as a single-mode dielectric optical waveguide (SMDOW) and embodiments of the invention may be formed. This may include, but not be limited to, InP, GaAs, silicon, silica-on-silicon, silica, silica-on-polymer, glass, a metal, a ceramic, a polymer, or a combination thereof.

A "metal" as used herein and throughout this disclosure refers to, but is not limited to, a material (element, compound, and alloy) that has good electrical and thermal conductivity as a result of readily losing outer shell electrons. This may include, but not be limited to, gold, chromium, aluminum, silver, platinum, nickel, copper, rhodium, palladium, tungsten, and combinations of such materials.

References to "an embodiment", "another embodiment", "yet another embodiment", "one example", "another example", "yet another example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Figure 1:
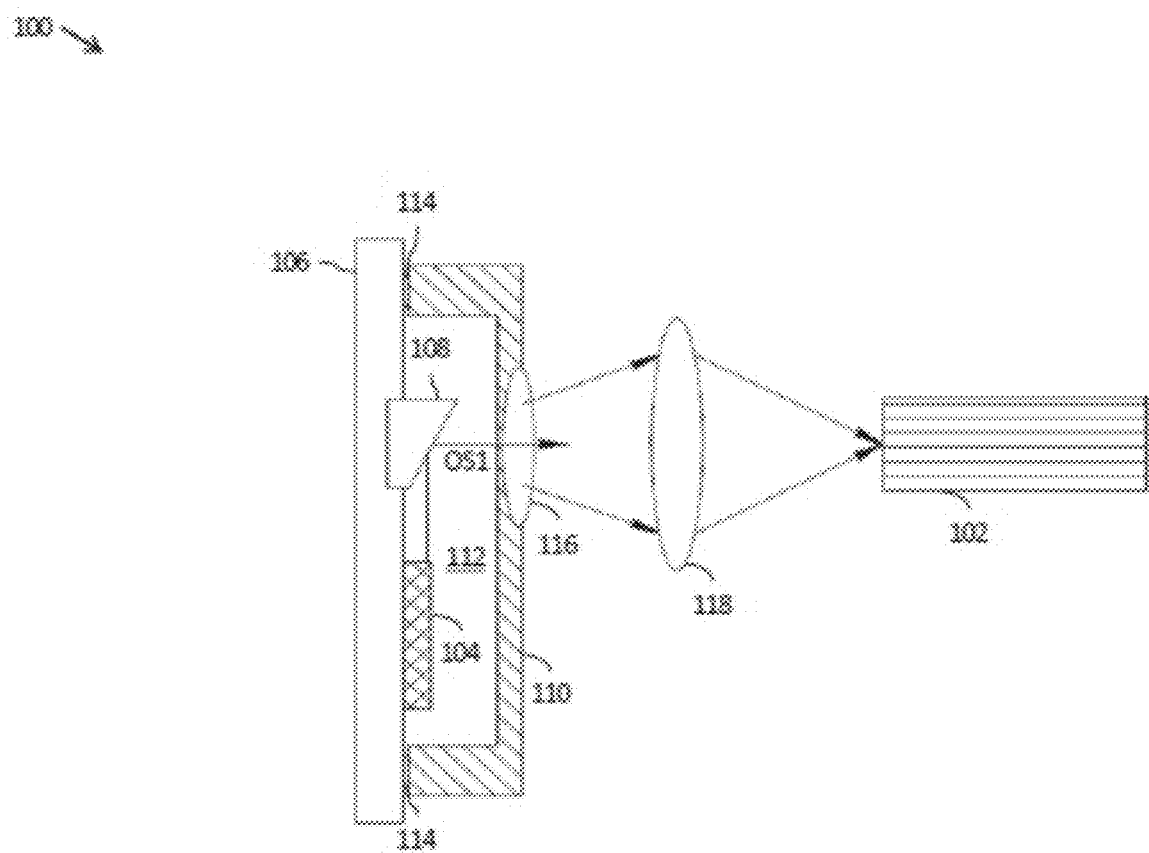
FIG. 1 shows a cross-sectional view of a first conventional optoelectronic package for coupling optical signals to an optical fiber.
Figure 2:
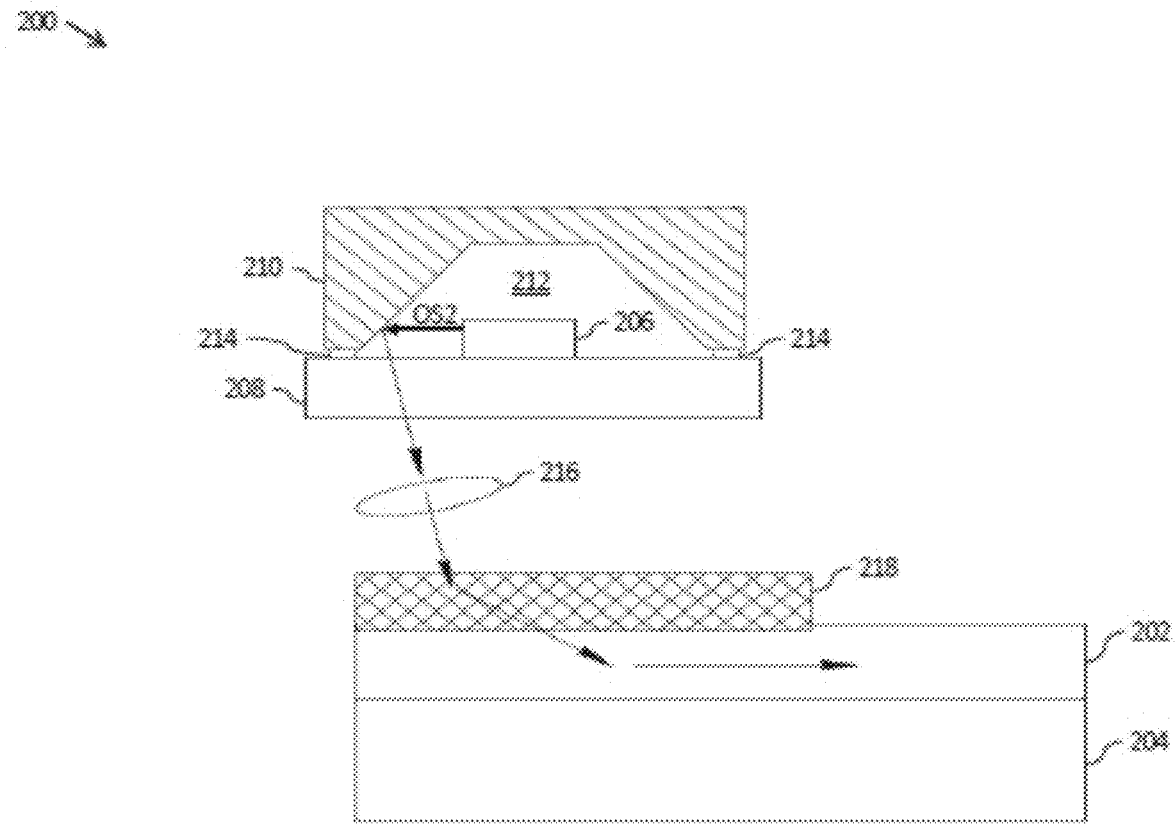
FIG. 2 shows a cross-sectional view of a second conventional optoelectronic package for coupling optical signals to an optical waveguide of a silicon photonic chip.
Figure 3:
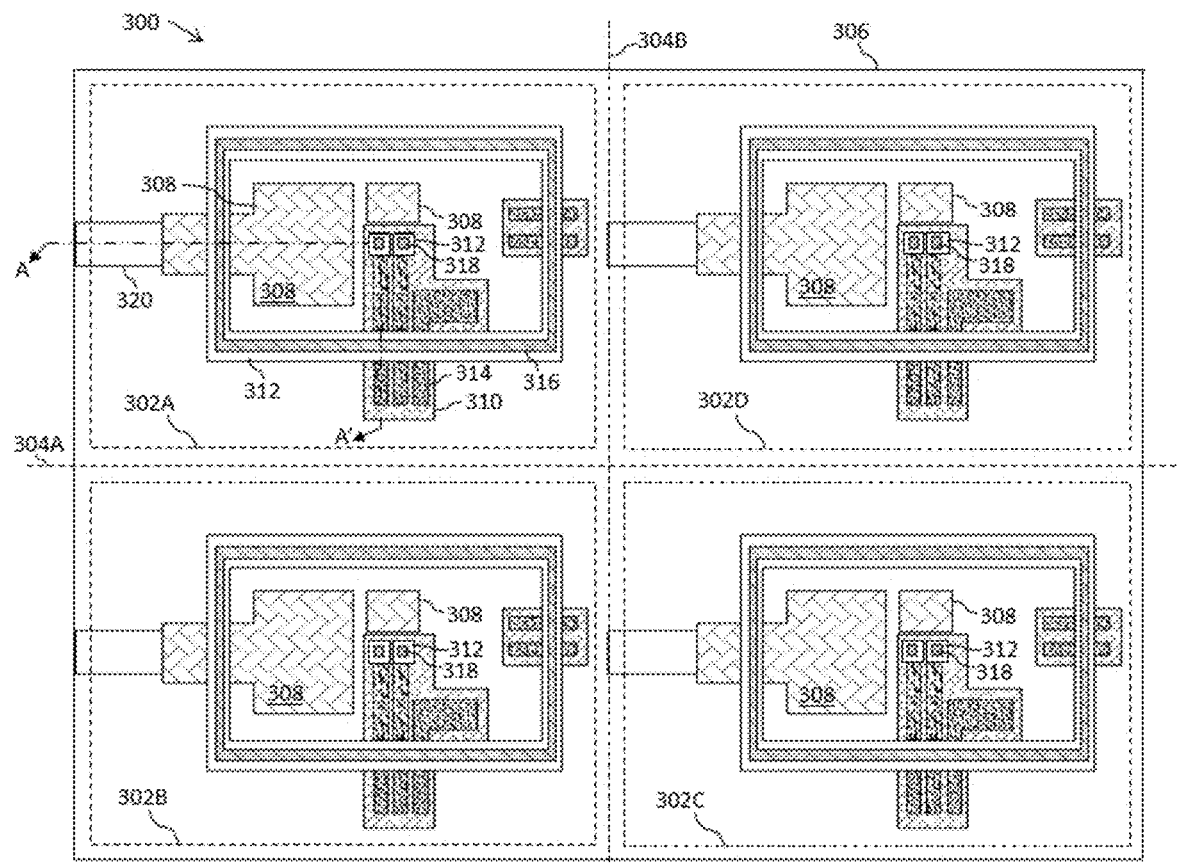
FIG. 3 is a top view illustrating a pre-singulated wafer, in accordance with an embodiment of the present invention.

Referring now to FIG. 3, a top-view illustrating a pre-singulated wafer 300, in accordance with an embodiment of the present invention, is shown. The pre-singulated wafer 300 includes multiple sub-mounts of which first through fourth sub-mounts 302A-302D are shown. The second through fourth sub-mounts 302B-302D are structurally and functionally similar to the first sub-mount 302A. The top view of the pre-singulated wafer 300 further illustrates first and second singulation axis 304A and 304B of the pre-singulated wafer 300. The first and second singulation axis 304A and 304B represent the axis along which the pre-singulated wafer 300 may be diced.

The top view of the first sub-mount 302A illustrates a first substrate 306, an optical waveguide 308, first and second dielectric layers 310-312, first through third metal layers 314-318, and a v-groove 320. The pre-singulated wafer 300 may be used to manufacture a plurality of optoelectronic packages.

The fabrication of the first sub-mount 302A is explained in conjunction with FIGS. 4A-4F. The fabrication of the second through fourth sub-mounts 302B-302D is similar to the fabrication of the first sub-mount 302A. Further, the second through fourth sub-mounts 302B-302D are fabricated simultaneously with the first sub-mount 302A.

Referring now to FIGS. 4A-4F, steps for fabricating the first sub-mount 302A, in accordance with an embodiment of the present invention, are shown. The steps for fabricating the first sub-mount 302A are explained with reference to the section A-A' of the pre-singulated wafer 300.

The structure 400A illustrates the first substrate 306 on which the optical waveguide 308 is formed. The first substrate 306 may be formed from various materials. Examples of such materials include semiconductor materials; such as silicon, ceramic materials; such as aluminum nitride, and amorphous materials; such as glass, quartz, and the like. The optical waveguide 308 is formed on the first substrate 306 by using a thin-film dielectric deposition method. The optical waveguide 308 includes a lower cladding layer 308A, a core layer 308B, and an upper cladding layer 308C. The optical waveguide 308 is a single-mode dielectric optical waveguide (SMDOW) that allows a single-mode optical signal having only a fundamental transverse electronic mode, i.e., TEM(00), to propagate through it. A refractive index of the core layer 308B is greater than refractive indices of the lower and upper cladding layers 308A and 308C. The optical waveguide 308 may be formed from various materials; such as dielectric materials that include silica, silicon nitride, ceramic materials; such as aluminum nitride, and amorphous materials; such as glass, quartz, and the like.

The optical waveguide 308 is etched by using a first patterned mask (not shown) to obtain the structure 400B. Due to etching of the optical waveguide 308, the first substrate 306 is exposed in opening portions 402A-402C.

Figure 4A:
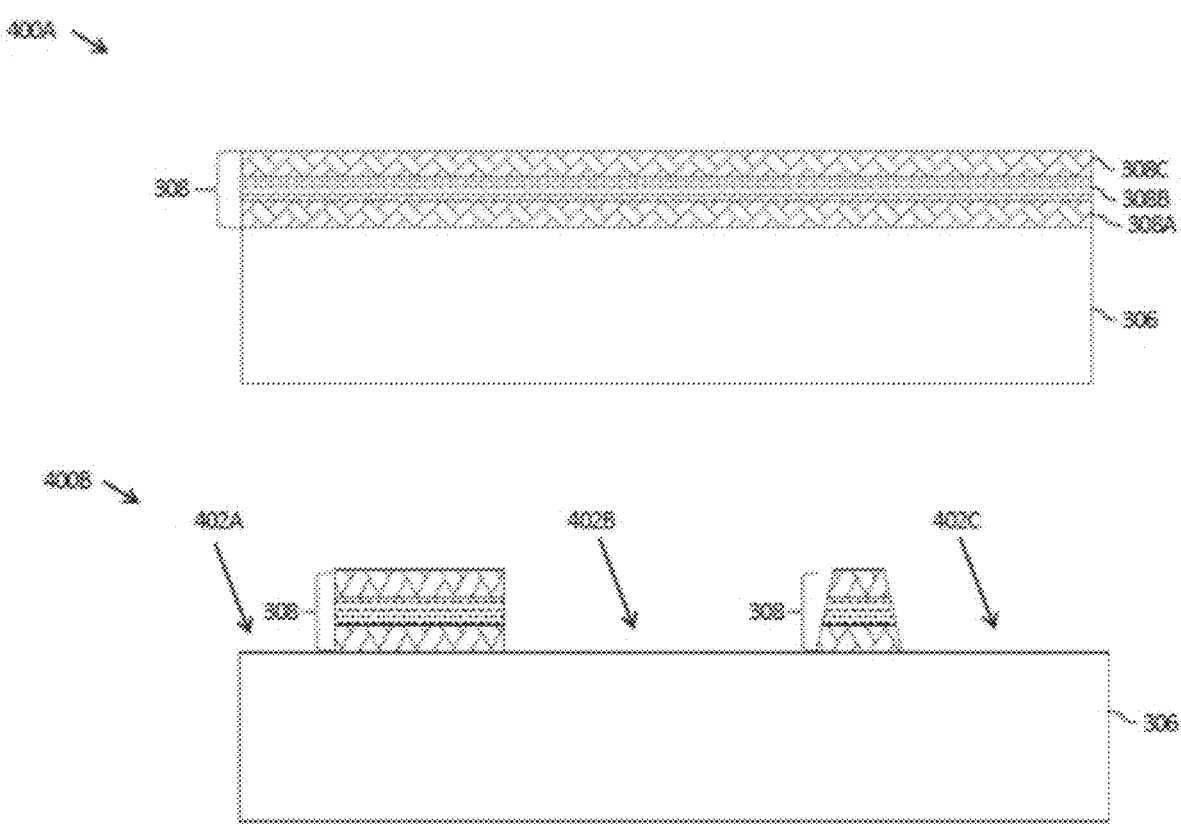
FIGS. 4A-4F illustrate steps for fabricating a first sub-mount of the plurality of sub-mounts of FIG. 3, in accordance with an embodiment of the present invention.
Figure 4B:
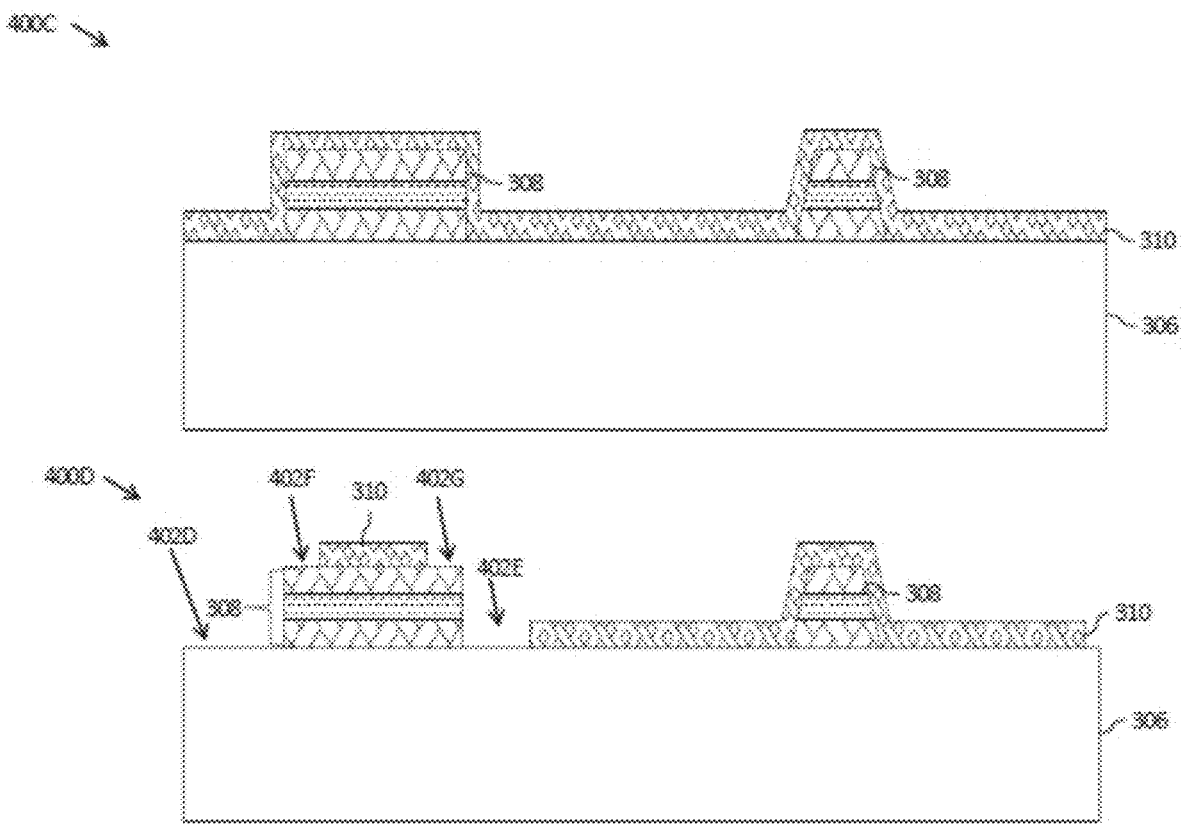

With reference to FIG. 4B, the first dielectric layer 310 is deposited in the opening portions 402A-402C and on the optical waveguide 308 of the structure 400B to obtain the structure 400C. The first dielectric layer 310 is a thin-film dielectric material. Examples of the materials used for forming the first dielectric layer 310 may include a photosensitive polyimide dielectric material.

The first dielectric layer 310 is then patterned by using a second patterned mask (not shown). In an embodiment, a photolithography technique may be used for patterning the first dielectric layer 310. In the photolithography technique, the first dielectric layer 310 may be exposed to light by way of the second patterned mask. Due to patterning of the first dielectric layer 310, the first substrate 306 is exposed in opening portions 402D and 402E, and the optical waveguide 308 is exposed in opening portions 402F and 402G to obtain the structure 400D.

Figure 4C:
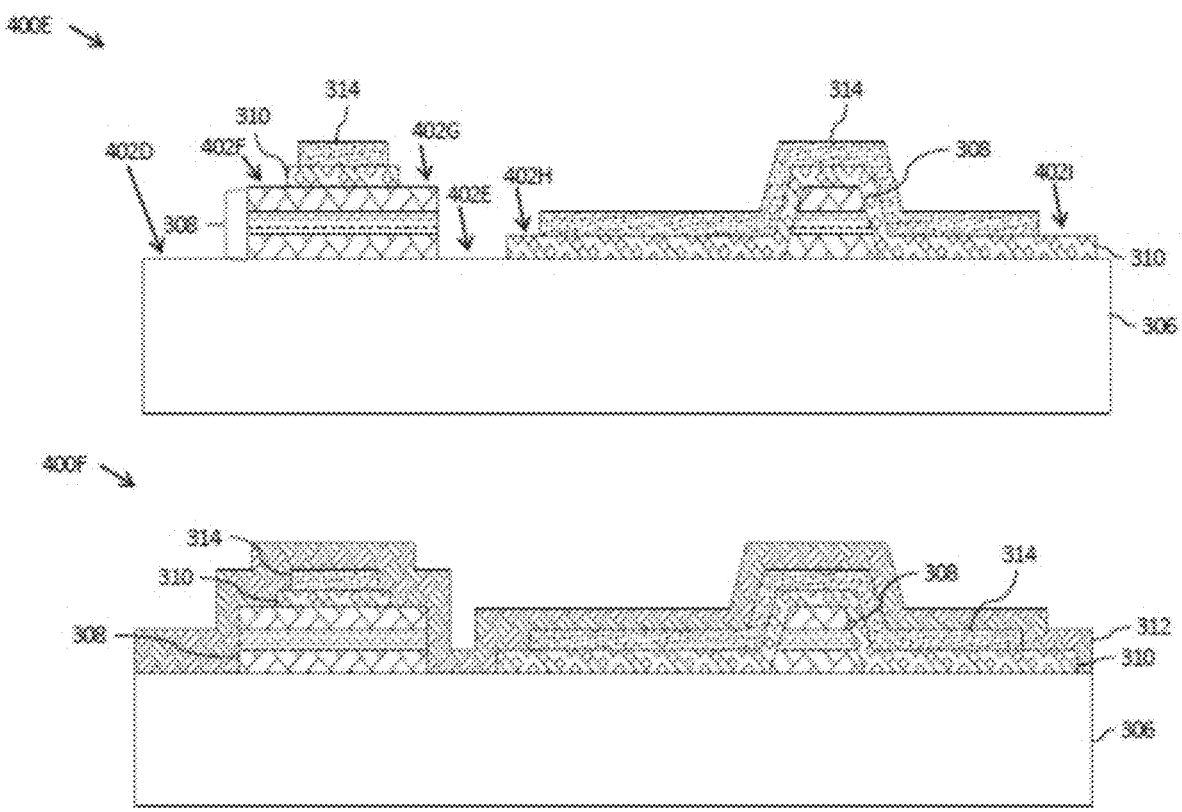

With reference to FIG. 4C, the first metal layer 314 is then deposited on the first dielectric layer 310. The first metal layer 314 is a high-frequency electrical wiring trace that supports high-performance electrical connectivity within a range of 0 Hz to 40 GHz. Examples of materials used for forming the first metal layer 314 may include gold, chromium, aluminum, silver, platinum, nickel, copper, rhodium, palladium, tungsten, and combinations of such materials. The first metal layer 314 may be formed on the first dielectric layer 310 by using pattern deposition techniques. The first dielectric layer 310 isolates the first metal layer 314 from the first substrate 306 and the optical waveguide 308 to prevent any electrical contact. Due to the deposition of the first metal layer 314 on the first dielectric layer 310, the first dielectric layer 310 is exposed in opening portions 402H and 402I to obtain the structure 400E.

The second dielectric layer 312 is then deposited on the first metal layer 314, the first dielectric layer 310 that is exposed in the opening portions 402H and 402I, the first substrate 306 that is exposed in the opening portions 402D and 402E, and the optical waveguide 308 that is exposed in the opening portions 402F and 402G, to obtain the structure 400F. The second dielectric layer 312 is a thin-film dielectric material. Examples of the materials used for forming the second dielectric layer 312 may include a photosensitive polyimide dielectric material.

Figure 4D:
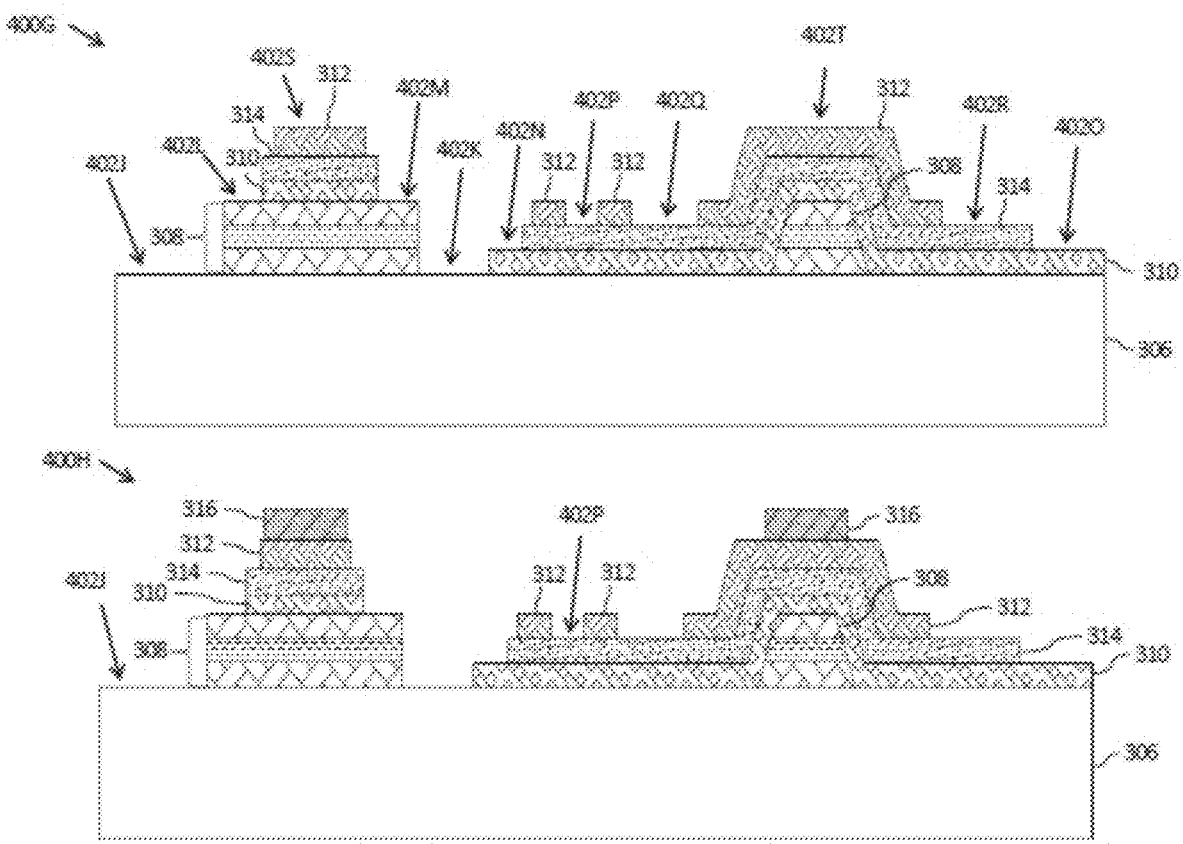

With reference to FIG. 4D, the second dielectric layer 312 is then patterned by using a third patterned mask (not shown). In an embodiment, the photolithography technique may be used for patterning the second dielectric layer 312. In the photolithography technique, the second dielectric layer 312 may be exposed to light by way of the second patterned mask. Due to patterning of the second dielectric layer 312, the first substrate 306 is exposed in opening portions 402J and 402K, the optical waveguide 308 is exposed in opening portions 402L and 402M, the first dielectric layer 310 is exposed in opening portions 402N and 402O, and the first metal layer 314 is exposed in opening portions 402P-402R to obtain the structure 400G. The second metal layer 316 is then deposited on the second dielectric layer 312 that is exposed in opening portions 402S and 402T to obtain the structure 400H.

Figure 4E:
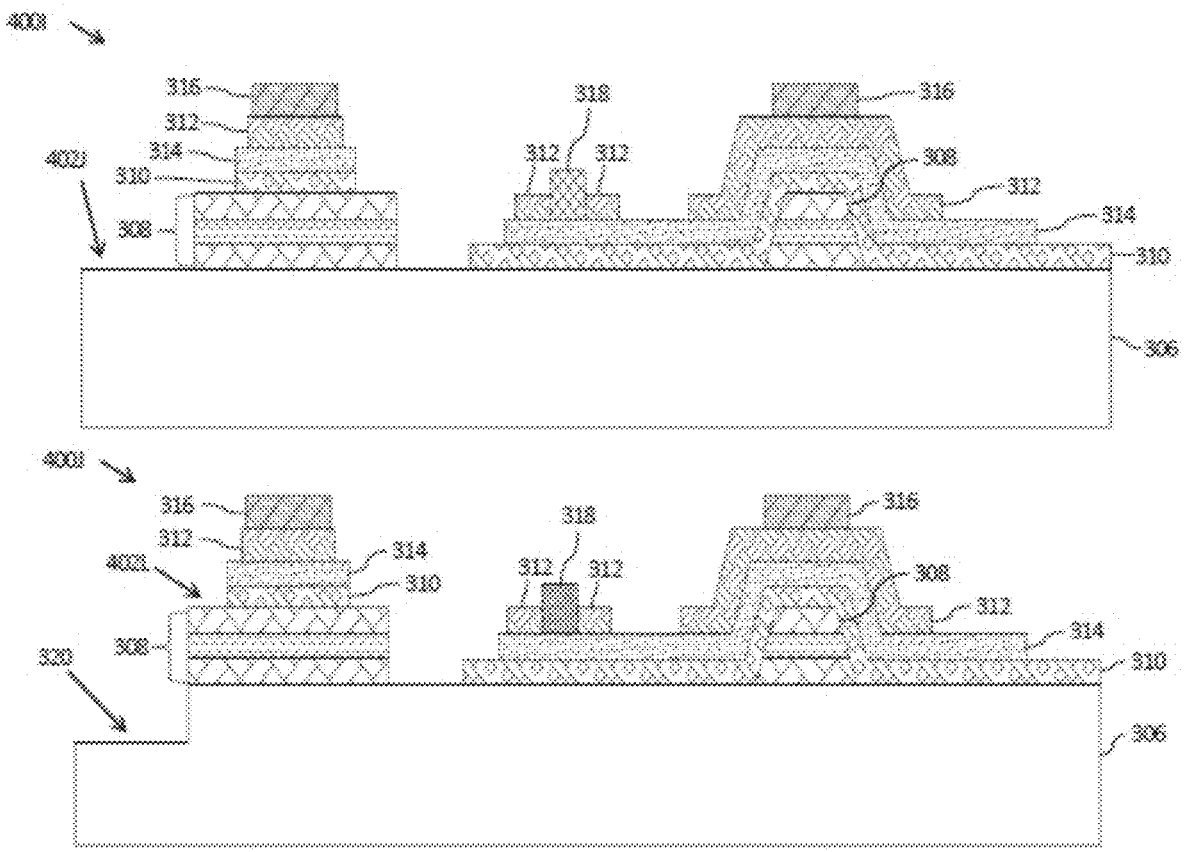

With reference to FIG. 4E, the third metal layer 318 is deposited on the first metal layer 314 that is exposed in the opening portion 402P to obtain the structure 400I. The second and third metal layers 316 and 318 are conductive metal layers. The second metal layer 316 has a lower melting point than the third metal layer 318. Examples of materials used for forming the second metal layer 316 include gold, chromium, aluminum, silver, platinum, nickel, copper, rhodium, palladium, tungsten, and combinations of such materials. The third metal layer 318 has a eutectic composition, such as gold-tin alloy.

The first substrate 306 is then etched at the opening portion 402J to form the v-groove 320 by using self-alignment lithography technique. The v-groove 320 is formed adjacent to the optical waveguide 308 that is exposed in the opening portion 402L. The structure 400J illustrates the v-groove 320. The position of the v-groove 320 is such that when an optical fiber is placed in the v-groove 320, an exit facet of the optical waveguide 308 is accurately aligned to the centre of the optical fiber. The exit facet of the optical waveguide 308 is adjacent to the v-groove 320.

Figure 4F:
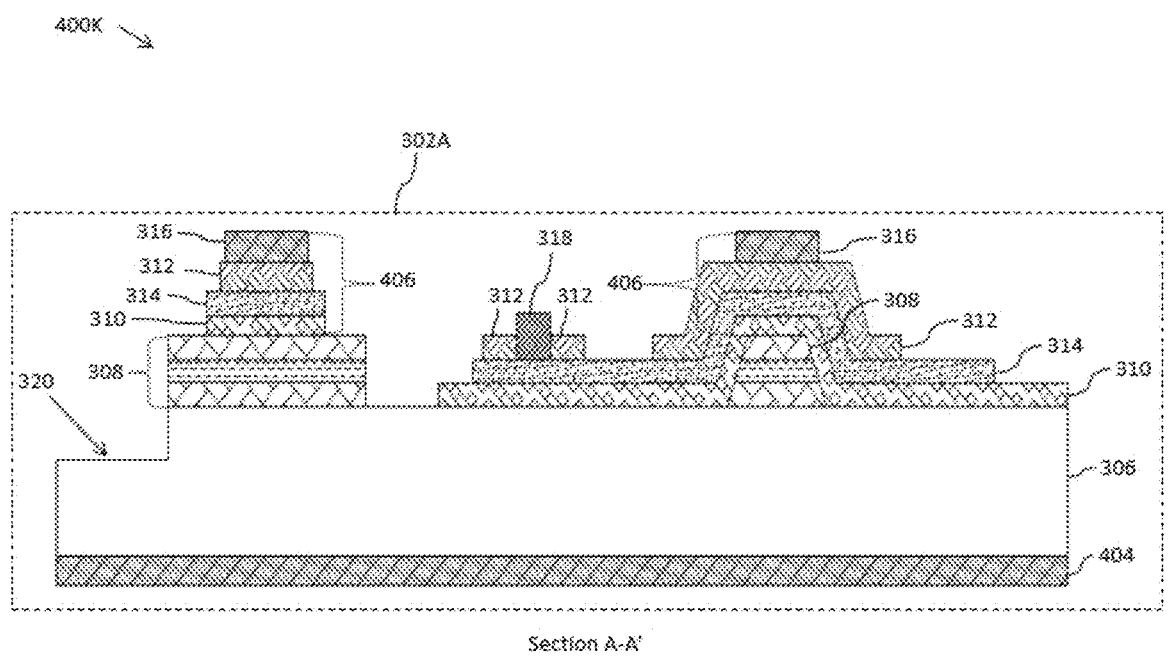

With reference to FIG. 4F, a fourth metal layer 404 is then formed on a bottom surface of the first substrate 306 to obtain the structure 400K. Examples of materials used for forming the fourth metal layer 404 include gold, chromium, aluminum, silver, platinum, nickel, copper, rhodium, palladium, tungsten, and combinations of such materials.

The structure 400K illustrates the first sub-mount 302A of the pre-singulated wafer 300 along the section A-A' as shown in FIG. 3. The multilayered structure, including the first dielectric layer 310, the first metal layer 314, the second dielectric layer 312, and the second metal layer 316, formed on the optical waveguide 308 is a sub-mount boundary wall 406 of the first sub-mount 302A. The third metal layer 318 represents a die-attachment site of the first sub-mount 302A. The height of the sub-mount boundary wall 406 of the first sub-mount 302A is same as the heights of the sub-mount boundary walls of the other sub-mounts, such as the second through fourth sub-mounts 302B-302D, thereby enabling a uniformity of topography height across the pre-singulated wafer 300.

Figure 5A:
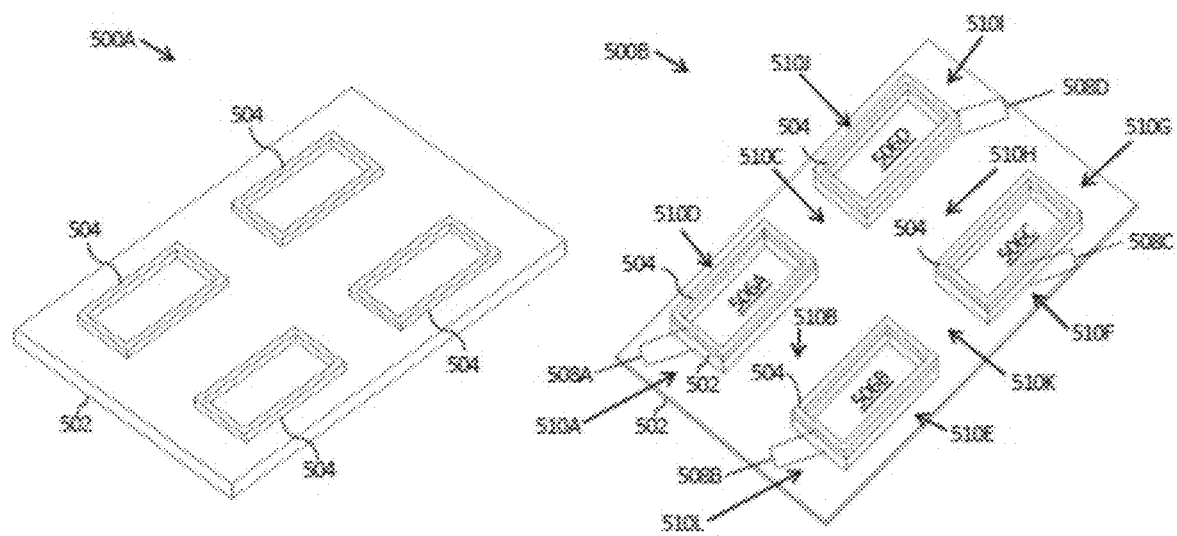
FIGS. 5A and 5B illustrate steps for fabricating a cap-wafer, in accordance with an embodiment of the present invention.
Figure 5B:
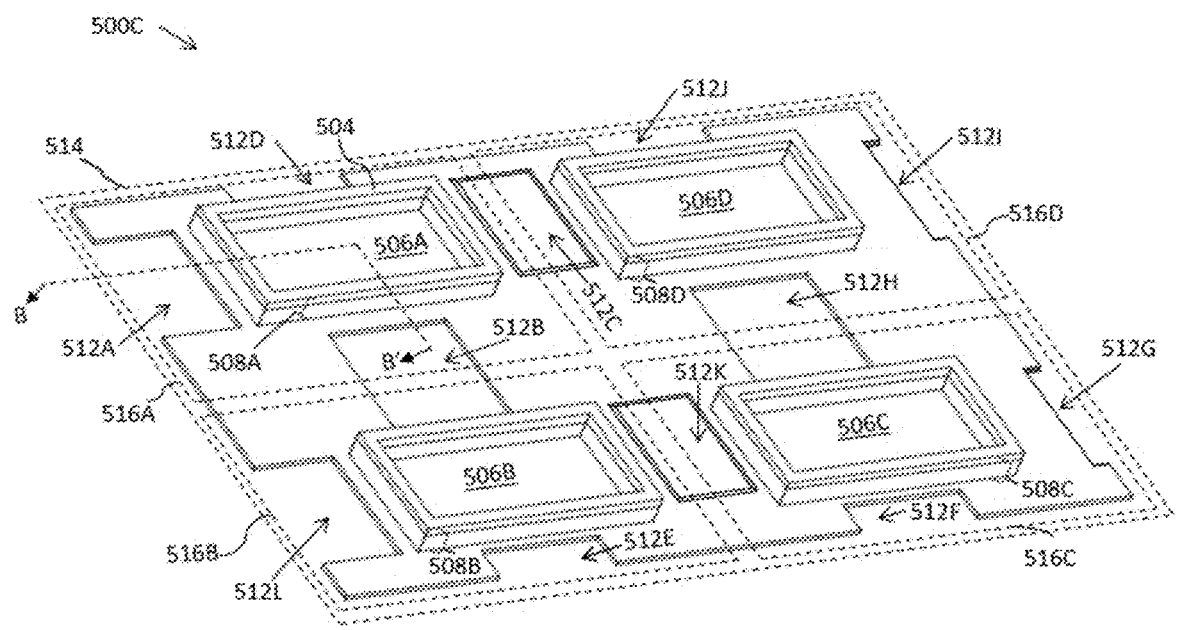

Referring now to FIGS. 5A and 5B, steps for fabricating a cap-wafer, in accordance with an embodiment of the present invention, are shown.

A perspective view 500A illustrates a second substrate 502 on which a fifth metal layer 504 is formed. The fifth metal layer 504 is formed by using the pattern deposition technique. Examples of materials used for forming the fifth metal layer 504 include gold, chromium, aluminum, silver, platinum, nickel, copper, rhodium, palladium, tungsten, and combinations of such materials. The second substrate 502 is then etched to form first through fourth depressions 506A-506D on the second substrate 502, as illustrated in a perspective view 500B. The fifth metal layer 504 prevents the etching of a portion of the second substrate 502 that lies beneath the fifth metal layer 504, thereby resulting in the formation of first through fourth cap boundary walls 508A-508D. Each of the first through fourth cap boundary walls 508A-508D includes the fifth metal layer 504 and the portion of the second substrate 502 that lies beneath the fifth metal layer 504.

With reference to FIG. 5B, the second substrate 502 is completely etched at opening portions 510A-510L to obtain the structure illustrated in a perspective view 500C. Due to etching of the second substrate 502 at the opening portions 510A-510L, first through twelfth openings 512A-512L are formed on the second substrate 502.

The structure illustrated in the perspective view 500C is a cap-wafer 514 that has first through fourth caps 516A-516D. The first cap 516A has the first depression 506A, the first cap boundary wall 508A that includes the fifth metal layer 504, and the first through fourth openings 512A-512D. The second through fourth caps 516B-516D are structurally and functionally similar to the first cap 516A. In an embodiment, the cap-wafer 514 may be fabricated to match the pre-singulated wafer 300. Further, the height of the first through fourth cap boundary walls 508A-508D is same across the cap-wafer 514, thereby enabling a uniformity of topography height across the cap-wafer 514.

In an embodiment, the cap-wafer 514 may be attached to the pre-singulated wafer 300, such that the fifth metal layer 504 of the cap-wafer 514 is bonded to the second metal layer 316 of the pre-singulated wafer 300. The attachment of the cap-wafer 514 to the pre-singulated wafer 300 is explained in conjunction with FIGS. 7A-7C.

Figure 6:
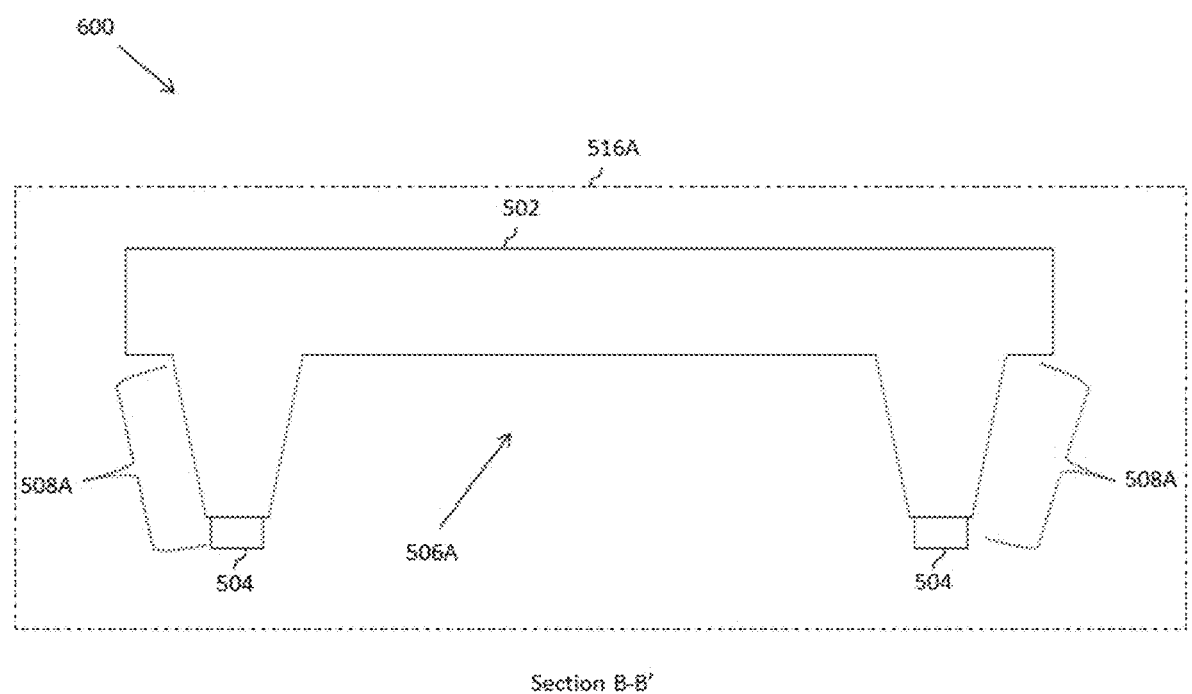
FIG. 6 is a cross-sectional view of a first cap of the cap-wafer of FIGS. 5A and 5B, in accordance with an embodiment of the present invention.

Referring now to FIG. 6, a cross-sectional view 600 of the first cap 516A along section B-B' of the cap-wafer 514 of FIGS. 5A and 5B, in accordance with an embodiment of the present invention is shown. The cross-sectional view 600 illustrates the second substrate 502, the first depression 506A, the first cap boundary wall 508A, and the fifth metal layer 504 of the first cap 516A.

Figure 7A:
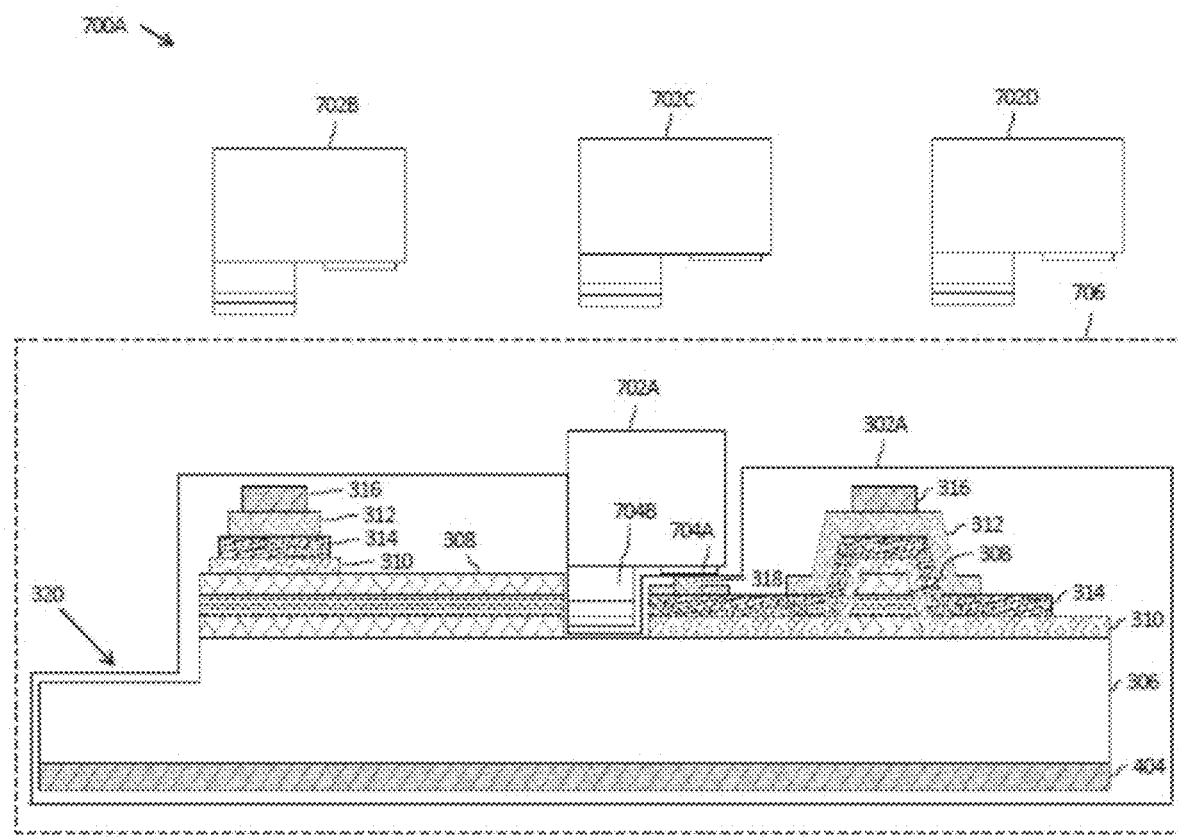
FIGS. 7A-7C are cross-sectional views that illustrate a wafer-level optoelectronic packaging method, in accordance with an embodiment of the present invention.
Figure 7B:
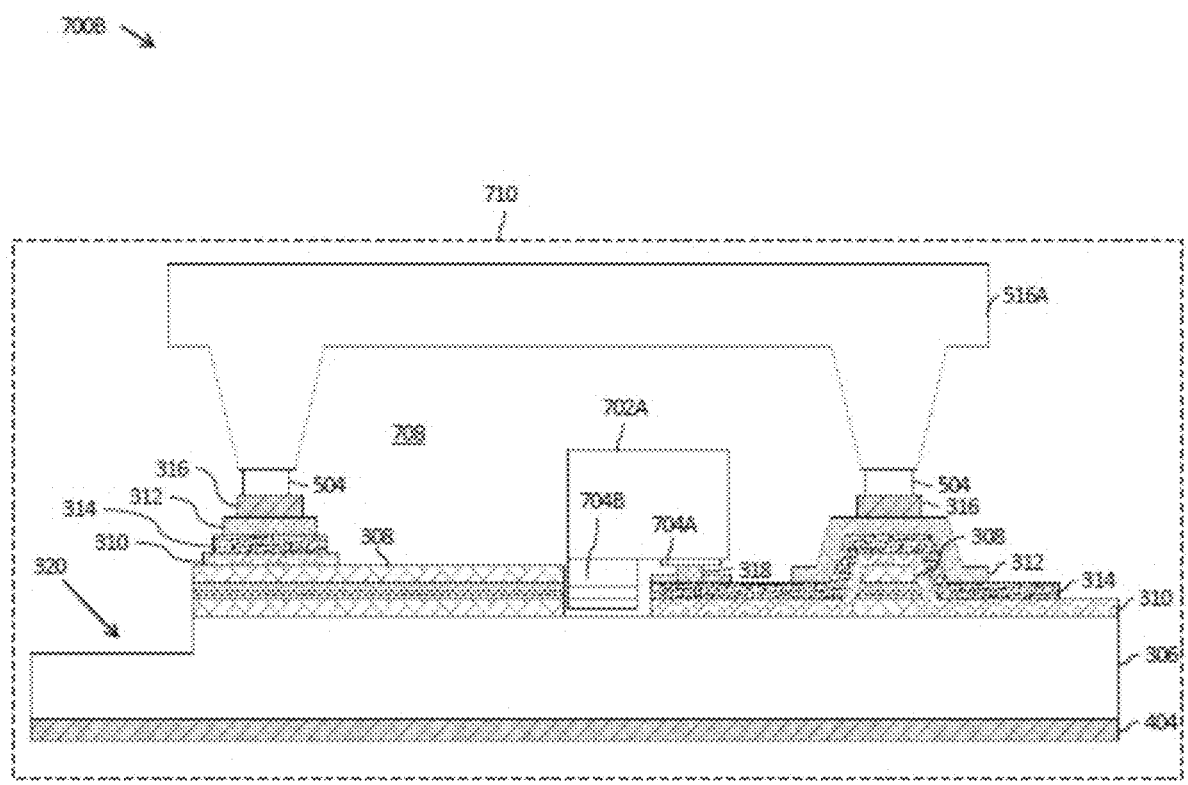
Figure 7C:
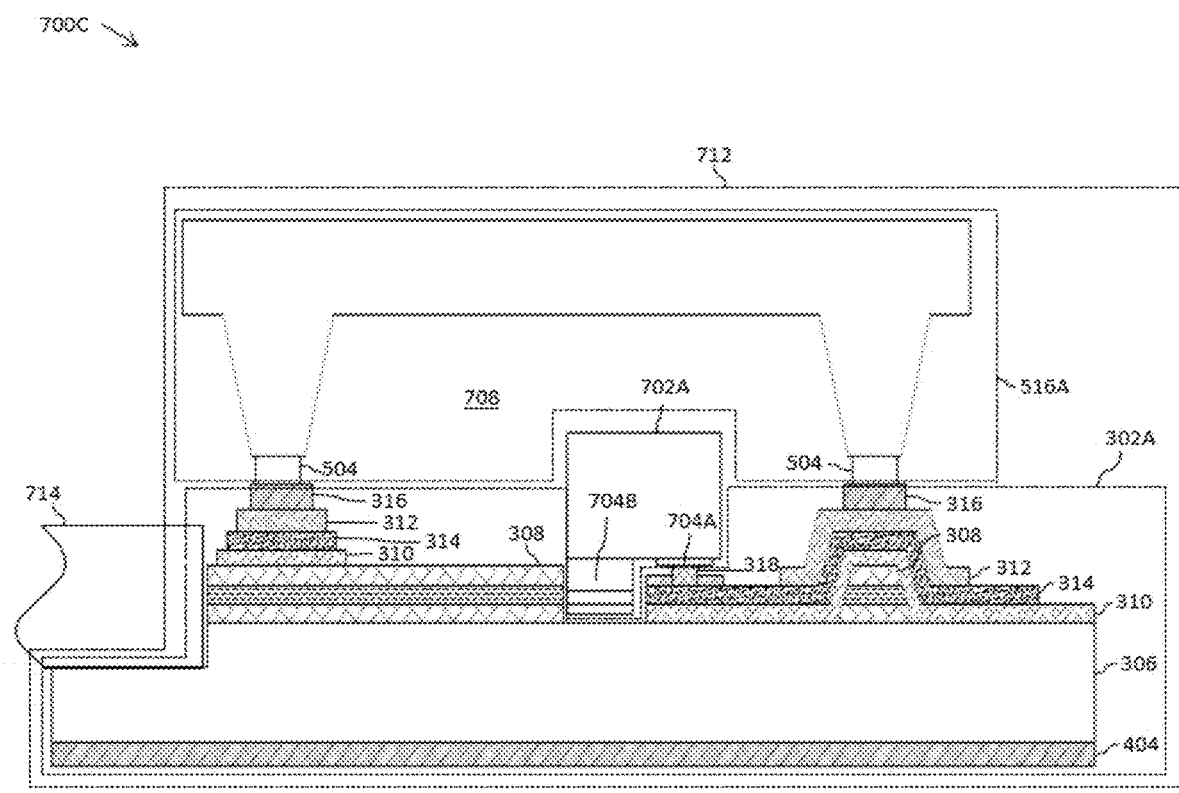

Referring now to FIGS. 7A-7C, cross-sectional views 700A-700C illustrating a wafer-level optoelectronic packaging method, in accordance with an embodiment of the present invention, are shown. With reference to FIG. 7A, the cross-sectional view 700A illustrates a first optical die 702A that is attached to the first sub-mount 302A. The cross-sectional view 700A further illustrates second through fourth optical dies 702B-702D. The first through fourth optical dies 702A-702D are hereinafter referred to as "optical dies 702A-702D".

The first optical die 702A includes a bond pad 704A and an optical coupler 704B. In an embodiment, the first optical die 702 may further have alignment features (not shown). The alignment features are fiducial marks that are formed at corners, edges, or center of the first optical die 702. Further, the first sub-mount 302A may also include the alignment features (not shown) that correspond to the alignment features of the first optical die 702. In one embodiment, the first sub-mount 302A may further include one or more micromachined mating features (not shown), such as stand-offs and stop-blocks. The first optical die 702A is a single-mode circuitry that is formed by integrating various single-mode photonic devices, such as the optical coupler 704B, an array waveguide grating (AWG) (not shown), and a mode-size-converter (not shown). The first optical die 702A emits an optical signal that is single-mode. The second through fourth optical dies 702B-702D are structurally and functionally similar to the first optical die 702A. Examples of the first through fourth optical dies 702A-702D may include waveguide-based diode lasers, photo-detectors, planar lightwave circuits (PLCs), and the like.

For attaching the first optical die 702A to the first sub-mount 302A, the pre-singulated wafer 300 of FIG. 3 is placed on a placement bench (not shown) of a die-placement tool (not shown). The die-placement tool places the first optical die 702A on the first sub-mount 302A, such that the bond pad 704A of the first optical die 702A comes in contact with the third metal layer 318. For placing the first optical die 702A on the first sub-mount 302A, the die-placement tool aligns the alignment feature of the first optical die 702A with the alignment feature of the first sub-mount 302A by using optical microscopy alignment method. In one example, the die-placement tool uses an optical microscope (not shown) to align the alignment feature of the first optical die 702A with the alignment feature of the first sub-mount 302A, such that the alignment feature of the first optical die 702A overlaps the alignment feature of the first sub-mount 302A. In one embodiment, the mating features of the first sub-mount 302A may further aid in an accurate alignment of the first optical die 702A on the first sub-mount 302A.

The die-placement tool further places the remaining optical dies, such as the second through fourth optical dies 702B-702D, one by one on the second through fourth sub-mounts 302B-302D, respectively, by repeating the process similar to the process for the placement of the first optical die 702A, as explained in the foregoing description. It will be apparent to a person having ordinary skill in the art that more than one optical dies may be placed on a single sub-mount without deviating from the scope of the invention.

Figure 8A:
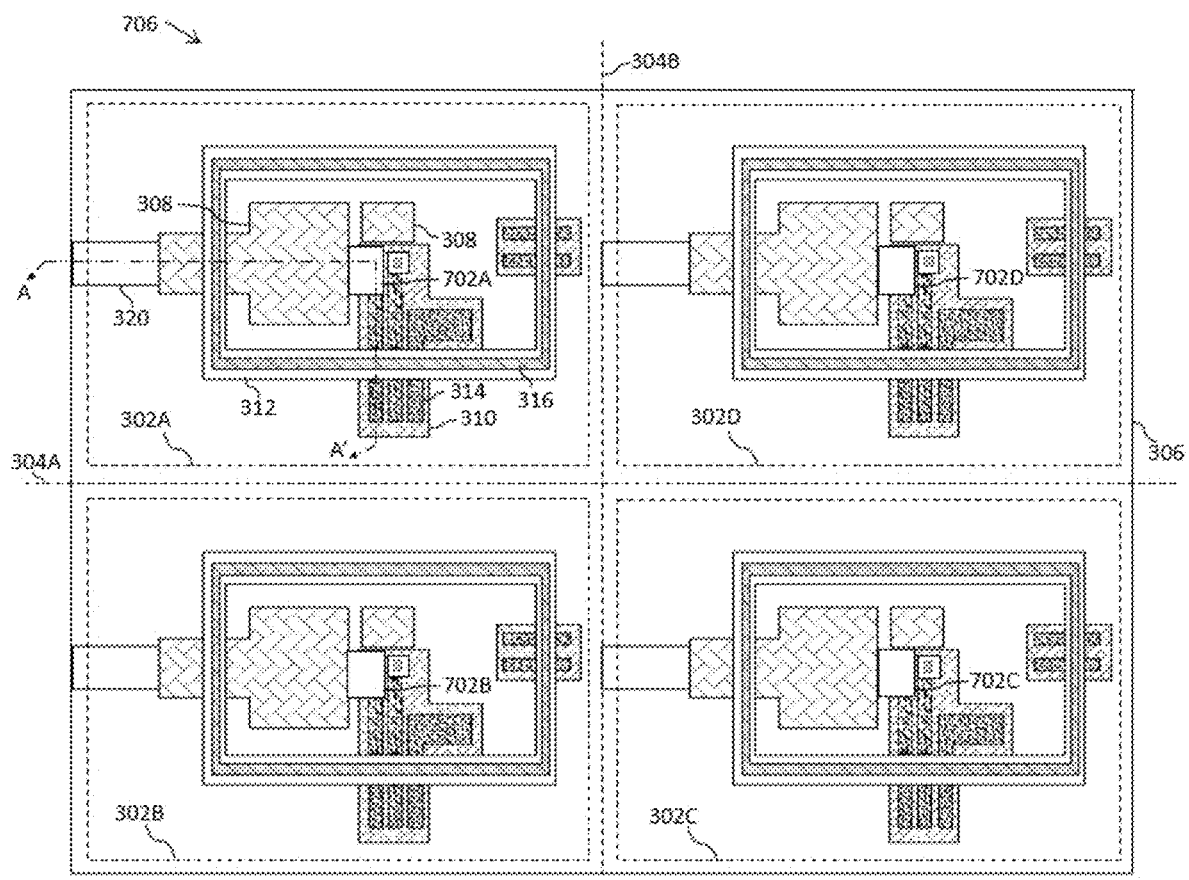
FIGS. 8A-8C are top views that illustrate a wafer-level optoelectronic packaging method, in accordance with an embodiment of the present invention.

When the first through fourth optical dies 702A-702D are placed on the first through fourth sub-mounts 302A-302D, the pre-singulated wafer 300 of FIG. 3 is unloaded from the placement bench of the die-placement tool and placed on reflow bench of a reflow station (not shown). In the reflow station, the pre-singulated wafer 300 is reflowed at a first temperature 'T0', such as 278° C., to permanently attach the optical dies 702A-702D to the first through fourth sub-mounts 302A-302D, respectively. When the first optical die 702A is attached to the first sub-mount 302A, the optical waveguide 308 that is adjacent to the first optical die 702A is accurately aligned with the optical coupler 704B of the first optical die 702A. The pre-singulated wafer 300 having the optical dies 702A-702D permanently attached to the first through fourth sub-mounts 302A-302D, respectively, is hereinafter referred to as a populated pre-singulated wafer 706. The populated pre-singulated wafer 706 illustrated in the cross-sectional view 700A is along the section A-A' of the pre-singulated wafer 300 of FIG. 3. A top view of the populated pre-singulated wafer 706 is shown in FIG. 8A.

With reference to FIG. 7B, the populated pre-singulated wafer 706 is unloaded from the reflow bench and placed on a placement bench (not shown) of a cap-placement tool (not shown). The cap-placement tool picks-up and places the cap-wafer 514 of FIG. 5B on the populated pre-singulated wafer 706. Thus, the first cap 516A overlaps the first sub-mount 302A. Further, the second metal layer 316 of the first sub-mount 302A comes in contact with the fifth metal layer 504 of the first cap 516A. It will be apparent to a person having ordinary skill in the art that when the cap-wafer 514 is placed on the populated pre-singulated wafer 706, the second through fourth caps 516B-516D overlap the second through fourth sub-mounts 302B-302D.

The first cap 516A, when placed over the first sub-mount 302A, forms a cavity 708 for enclosing the first optical die 702A. The cavity 708 is a hermetically sealed cavity for preventing any damage to the first optical die 702A from external environment.

Further, the cap-wafer 514 and the populated pre-singulated wafer 706 are reflowed at a second temperature "T1" to permanently attach the cap-wafer 514 to the populated pre-singulated wafer 706 for obtaining an encapsulated pre-singulated wafer 710. A top view of the encapsulated pre-singulated wafer 710 is shown in conjunction with FIG. 8B. The second temperature "T1" is kept lower than the first temperature 'T0' for preventing a secondary reflow of the third metal layer 318. The encapsulation of the populated pre-singulated wafer 706 by using the cap-wafer 514 is performed at wafer-level. Since the pre-singulated wafer 300 and the cap-wafer 514 have uniform topography height, the attachment of the cap-wafer 514 to the pre-singulated wafer 300 is uniform.

In one embodiment, the cap-wafer 514 may be diced to separate the first through fourth caps 516A-516D before being placed on the populated pre-singulated wafer 706. In such a scenario, the first through fourth caps 516A-516D are placed on the first through fourth sub-mounts 302A-302D, respectively, one after the other, and then the reflow operation is performed to permanently attach the first through fourth caps 516A-516D to the first through fourth sub-mounts 302A-302D, respectively, for obtaining the encapsulated pre-singulated wafer 710.

With reference to FIG. 7C, the encapsulated pre-singulated wafer 710 is then loaded on a placement bench (not shown) of a dicing tool (not shown). The dicing tool singulates the encapsulated pre-singulated wafer 710 along the first and second singulation axis 304A and 304B to obtain a first optoelectronic package 712 and second through fourth optoelectronic packages (as shown in FIG. 8C). The first optoelectronic package 712 includes the first optical die 702A enclosed in the cavity 708 formed by the first sub-mount 302A and the first cap 516A, and the v-groove 320 that is external to the cavity 708.

An optical fiber 714 is then placed in the v-groove 320 by using the optical microscopy alignment method. The optical fiber 714, when placed in the v-groove 320, gets automatically aligned to the portion of the optical waveguide 308 that lies outside the cavity 708. The optical waveguide 308 that lies inside the cavity 708 is aligned with the first optical die 702A, and the optical waveguide 308 that lies outside the cavity 708 is aligned with the optical fiber 714. Hence, the optical waveguide 308 serves as an interconnection conduit between the first optical die 702A and the optical fiber 714 for the propagation of an optical signal (not shown) emitted by the first optical die 702A. The first optical die 702A emits the optical signal that is received by the optical waveguide 308. The optical signal propagates through the optical waveguide 308 which couples the optical signal to the optical fiber 714. The accurate alignment of the optical waveguide 308 with the first optical die 702A and the optical fiber 714, achieves a coupling efficiency which is greater than 50%. The first optoelectronic package 712 may be mounted on an optical module assembly (not shown) by way of the fourth metal layer 404.

The first optoelectronic package 712 manufactured by the method as explained in the foregoing, has the optical waveguide 308 that is accurately aligned with the first optical die 702A for receiving the optical signal from the first optical die 702A, and is further aligned with the optical fiber 714 for coupling the optical signal to the optical fiber 714. As the optical waveguide 308 serves as an interconnection conduit between the first optical die 702A and the optical fiber 714 for propagating the optical signal emitted by the first optical die 702A, the first optoelectronic package 712 hence prevents the propagation of the optical signal in free space, and thereby reduces the propagation losses and increases the coupling efficiency. The optical waveguide 308 further eliminates the need of additional components, such as lenses, grating couplers, for coupling the optical signal from the first optical die 702A to the optical fiber 714, and therefore the first optoelectronic package 712 has a large wavelength bandwidth.

Figure 8B:
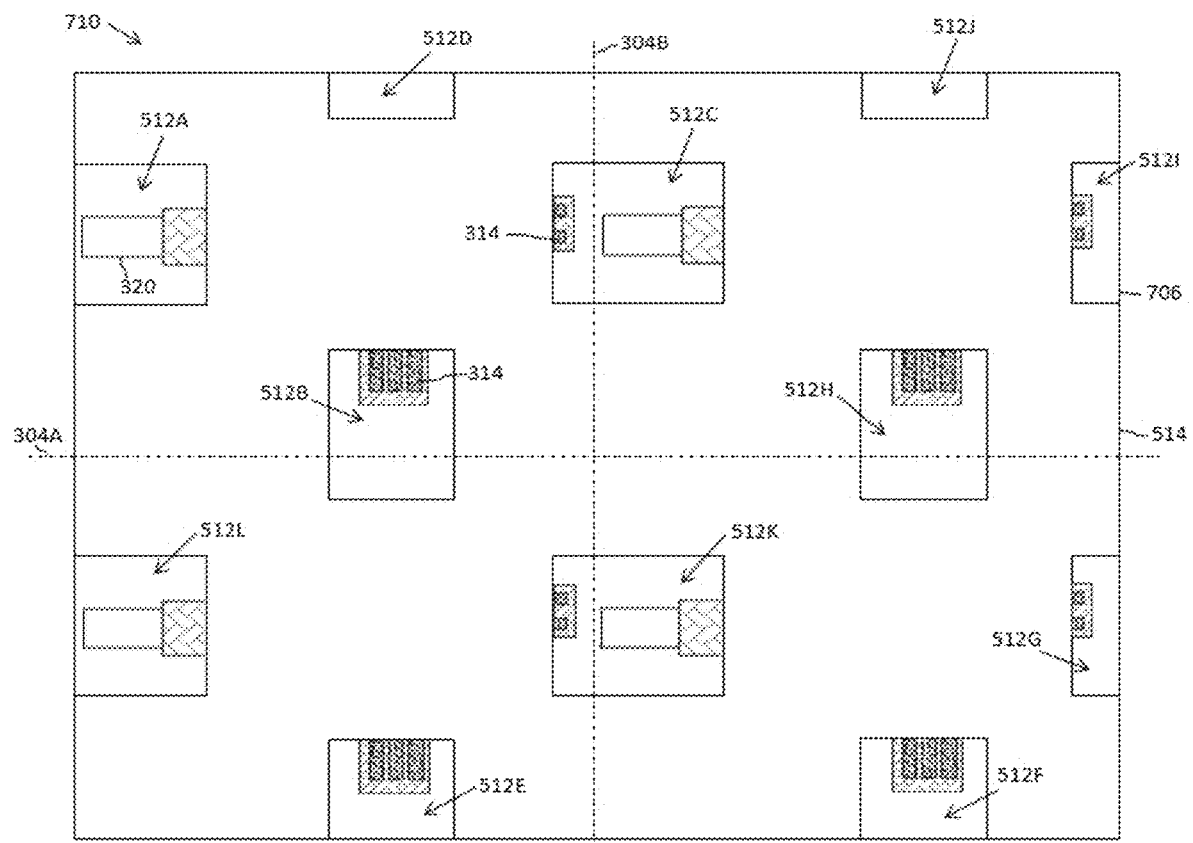
Figure 8C:
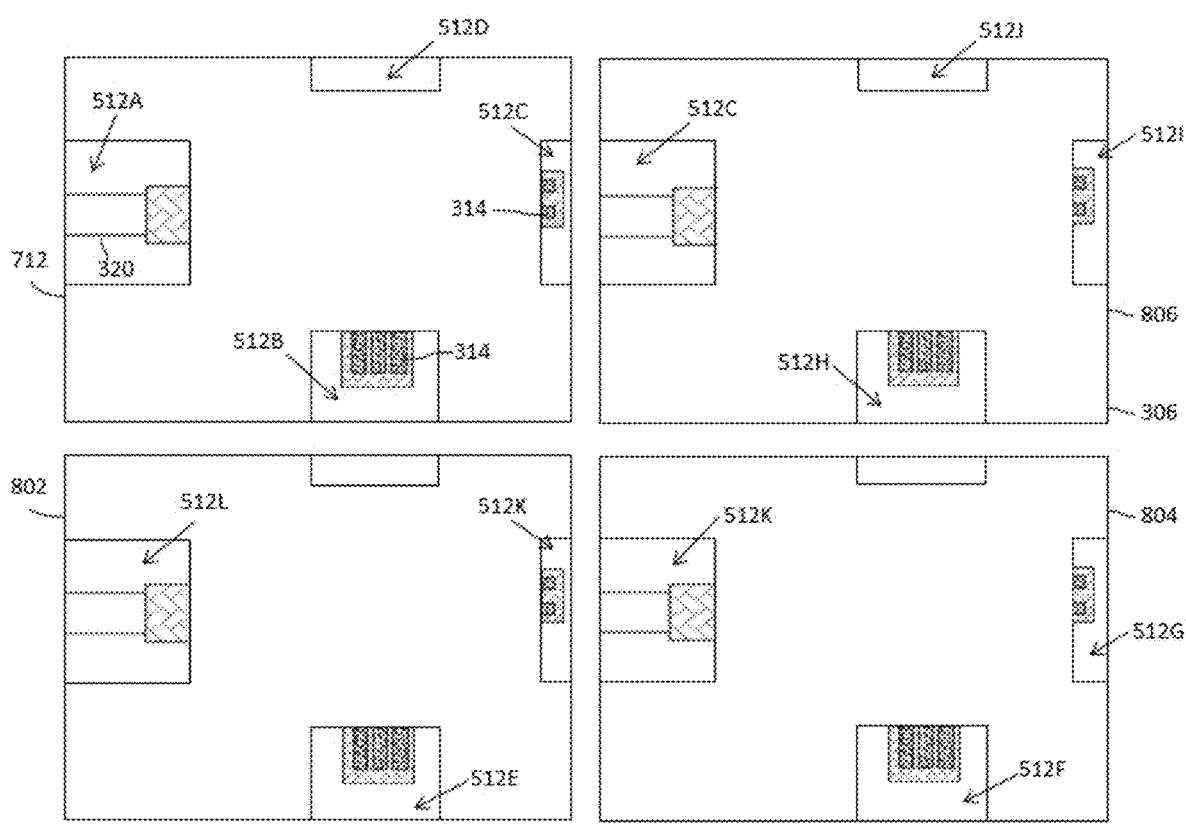

Referring now to FIGS. 8A-8C, top views that illustrate the wafer-level optoelectronic packaging method, in accordance with an embodiment of the present invention, are shown. With reference to FIG. 8A, the top view illustrates the populated pre-singulated wafer 706 of FIG. 7A. The first through fourth optical dies 702A-702D are permanently attached to the first through fourth sub-mounts 302A-302D, respectively.

With reference to FIG. 8B, the top view illustrates the encapsulated pre-singulated wafer 710 that is formed when the cap-wafer 514 is permanently attached to the populated pre-singulated wafer 706. The first opening 512A of the first cap 516A exposes the v-groove 320, where the optical fiber 714 is placed, and the second and third openings 512B and 512C expose the first metal layer 314 that lies outside the cavity 708.

With reference to FIG. 8C, the top view illustrates the first optoelectronic package 712 and the second through fourth optoelectronic packages 802-806 formed by dicing the encapsulated pre-singulated wafer 710 along the first and second singulation axis 304A and 304B. The second through fourth optoelectronic packages 802-806 are structurally and functionally similar to the first optoelectronic package 712 as shown in FIG. 7C.

Figure 9:
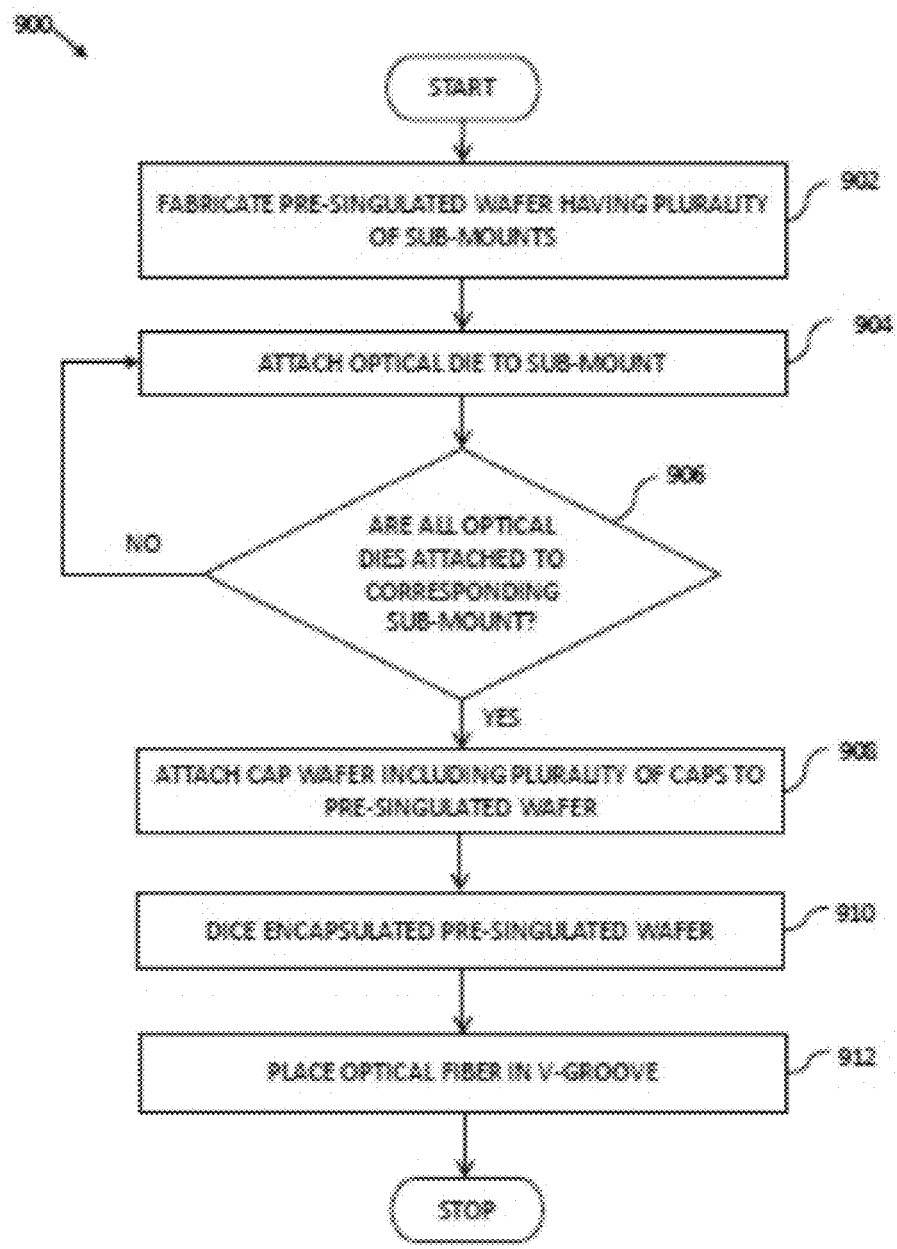
FIG. 9 is a flow chart that illustrates the wafer-level optoelectronic packaging method of FIGS. 7A-7C and FIGS. 8A-8C, in accordance with an embodiment of the present invention.

Referring now to FIG. 9, a flow chart that illustrates the wafer-level optoelectronic packaging method of FIGS. 7A-7C and FIGS. 8A-8C, in accordance with an embodiment of the present invention is shown.

At step 902, the pre-singulated wafer 300 having a plurality of sub-mounts, such as the first through fourth sub-mounts 302A-302D, is fabricated by performing the steps as explained in the foregoing. At step 904, the first through fourth optical dies 702A-702D are attached to the first through fourth sub-mounts 302A-302D, respectively, of the pre-singulated wafer 300.

At step 906, it is determined whether all the optical dies, such as the first through fourth optical dies 702A-702D are attached to the corresponding sub-mounts, such as the first through fourth sub-mounts 302A-302D, respectively. If at step 906, it is determined that all the optical dies 702A-702D are not attached to the first through fourth sub-mounts 302A-302D, respectively, step 904 is repeated, and a next optical die is attached to the corresponding sub-mount. If at step 906, it is determined that the optical dies 702A-702D are attached to the first through fourth sub-mounts 302A-302D, respectively, step 908 is performed.

At step 908, the cap-wafer 514 including a plurality of caps, such as the first through fourth caps 516A-516D, is attached to the pre-singulated wafer 300 that has all the optical dies 702A-702D permanently attached to the first through fourth sub-mounts 302A-302D, respectively, to obtain the encapsulated pre-singulated wafer 710.

At step 910, the encapsulated pre-singulated wafer 710 is diced to obtain a plurality of optoelectronic packages, such as the first through fourth optoelectronic packages 712, and 802-806. At step 912, the optical fiber 714 is placed in the v-groove 320 of the first optoelectronic package 712 for receiving the optical signal emitted by the first optical die 702A by way of the optical waveguide 308. Optical fibers that are similar to the optical fiber 714 may be placed in the v-grooves of the other optoelectronic packages of the plurality of optoelectronic packages.

Thus, each of the first through fourth optoelectronic packages 712 and 802-806 manufactured by the method as explained in the foregoing, prevents the propagation of the optical signal in free space, and thereby reduces the propagation losses. The first through fourth optoelectronic packages 712 and 802-806 further do not require additional components, such as lenses, grating couplers, for coupling the optical signal from the corresponding optical die to the corresponding optical fiber, and therefore has a large operational wavelength bandwidth with increased coupling efficiency.

Techniques consistent with the present invention provide, among other features, methods for wafer-level semiconductor die attachment. While various exemplary embodiments of the disclosed system and method have been described above it should be understood that they have been presented for purposes of example only, not limitations. It is not exhaustive and does not limit the invention to the precise form disclosed.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. An optoelectronic package, comprising:
   a sub-mount comprising:
   an optical waveguide formed on top of a substrate; and
   a sub-mount boundary wall,
      wherein the sub-mount boundary wall comprises a first portion abutting a portion of the optical waveguide,
      wherein the first portion of the sub-mount boundary wall and the portion of the optical waveguide comprises a same height,
      therein the first portion of the sub-mount boundary wall and the portion of the optical waveguide form an enclosed boundary,
      wherein the sub-mount boundary wall comprises a second portion on top of the enclosed boundary,
      wherein the second portion comprises
         a first dielectric layer formed on top of the enclosed boundary;
         a first metal layer formed on top of portions of the first dielectric layer, wherein the first metal layer comprises a wiring trace running across the boundary wall;

a second dielectric layer having a first portion formed on top of the first metal layer and a second portion formed on top of the first dielectric layer; and a second metal layer formed on top of the second dielectric layer;

an optical die that is attached to the sub-mount and surrounded by the sub-mount boundary wall; and a cap that is attached to the sub-mount boundary wall to form a cavity for fully enclosing the optical die.

2. The optoelectronic package of claim 1, wherein a first portion of the optical waveguide that lies inside the cavity is aligned with the optical die for receiving an optical signal from the optical die.

3. The optoelectronic package of claim 1, further comprising:

a third metal layer that is formed on top of a first portion of the wiring trace for electrically connecting to the optical die.

4. The optoelectronic package of claim 1, further comprising:

a v-groove that is formed by etching the substrate, and external to the sub-mount boundary wall.

5. The optoelectronic package of claim 4, further comprising:

an optical fiber that is placed in the v-groove, whereby the optical fiber is aligned with a second portion of the optical waveguide that lies outside the cavity for receiving an optical signal from the optical die.

6. The optoelectronic package of claim 5, wherein a top portion of the cap is larger than the surface area of the cavity defined by the boundary wall, wherein the top portion of the cap has a first opening outside of the surface area that exposes the v-groove for placing the optical fiber in the v-groove.

7. The optoelectronic package of claim 6, wherein the top portion of the cap has a second opening outside of the surface area to expose a first portion of the first metal layer that lies outside the cavity.

8. The optoelectronic package of claim 1, wherein the second metal layer comprises a metal alloy having a melting temperature lower than that of the first metal layer.

* * * * *